Patented Feb. 11, 1941

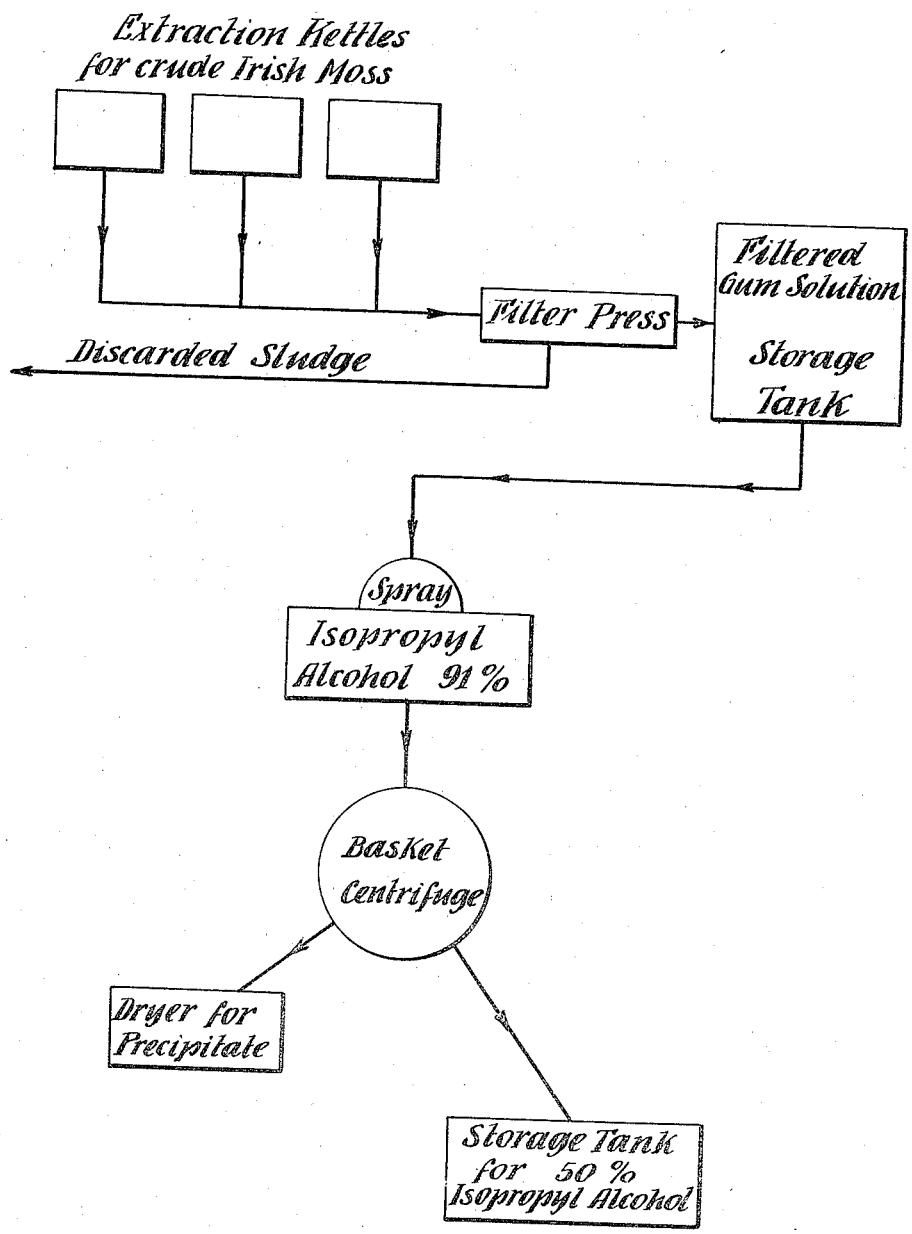

2,231,283

UNITED STATES PATENT OFFICE 2,231,283

MANUFACTURE OF IRISH MOSS

Arnold Pfister, Ridgewood, N. J., assignor to Jacques Wolf & Company, Passaic, N. J., a corporation of New Jersey Application July 29, 1937, Serial No. 156,299

9 Claims. (Cl. 260—209)

This invention relates to the manufacture of refined gum, more particularly to the manufacture of refined and purified vegetable gums or like colloids, and in one important specific aspect, to the manufacture of a highly refined and purified colloidal product of Irish moss (*Chondrus crispus*).

Heretofore the ordinary procedure for manufacturing refined gums in powdered or in any dissolved, i. e., hydrated, form has been to extract the crude vegetable product (such as Irish moss or other marine or land vegetation) with water customarily at boiling, to release the colloidal fraction from the crude fiber fraction. The latter is then removed from the former by filtration, often with the addition of an insoluble inorganic product, commonly called "filter-aid," to the mixture. That is, the filter cloths of the filter, together with the filter-aid, thus separate the crude fiber content and certain insoluble impurities, so as to yield a solution of the corresponding colloid. This procedure, however, does not remove odors, flavors, soluble salts, organic acids, starches (when they have been rendered soluble, as by a boiling or other cooking extraction), reducing sugars, colors, and other soluble impurities, which are usually and naturally present in the original crude vegetable product.

In the customary process the filtrate or solution of the colloid is then dried by any number of common processes employing heat transfer. In some instances, as where spray drying is used, further pulverization may not be necessary, but usually the dried product must be ground to increase its solubility or to make it marketable.

It has been found not only that the ordinary extraction and filtration fail to remove soluble impurities as explained, but that the drying of the filtrate has a deleterious effect on the desired colloid itself. In the first place, it appears that impurities inherently contained in the filtrate bring about chemical changes which act to reduce the viscosity of the dried colloidal material, and that the effect of the high degree of heat generally used for drying is to catalyze the destruction of viscosity, by hydrolysis. On the other hand, if low temperatures are used for drying, biological fermentations in the solution are decidedly favored during the long drying period then required, and these likewise decrease the viscosity of the colloid itself to a very great extent. Although preservatives may be added to control or obviate fermentation, they render the resultant product unfit for food purposes, for which these colloids, if purified, are especially adapted.

The usual methods of drying also bring about a decided darkening in the color of the product (which prevents obtaining a clear colloidal solution), and are apt to result in burning, charring or caramelization, giving the dried colloid a flavor generally undesirable for food products. Moreover, the usual procedures for refining gum tend to impair the rehydration factor (conveniently called "solubility"), and when the dried product has to be pulverized, as by grinding, there again occurs a definite decrease in the viscosity factor.

It is accordingly an important object of the present invention: to obviate or minimize one or more of the difficulties and disadvantages, particularly as hereinabove summarized, that are characteristic of previous methods for refining vegetable gums; at the same time, to provide a rapid, economical and relatively simple method of producing refined gum, as from Irish moss; and to produce thereby a colloid of greatly improved impurity, solubility, and viscosity.

Another object of the invention is to provide an improved colloidal material which may be derived from Irish moss, which is satisfactory for use in the manufacture of food products, and which has a viscosity, when in solution, far greater than that of the colloidal product heretofore obtained from Irish moss.

Other objects and advantages include those hereinafter stated or apparent in connection with the following description of an important and particularly useful example of the invention, involving the production of a purified colloid from Irish moss.

The drawing shows a diagrammatic flow-sheet of the procedure of the example now to be described.

A water solution of the gum is first established, for example, by extracting the raw Irish moss with water and then filtering out the crude fiber fraction, as in the usual manner hereinabove described. These steps are indicated in the drawing by the extraction kettles, filter press, and storage tank receiving the solution from which the fiber sludge has been removed. Although the extraction is preferably performed with hot water or with actual cooking, good results are obtained with a cold treatment in certain cases, and it will be understood by those skilled in the art that the character of the extraction for best colloid recovery at this stage may be varied in accordance with the kind of moss treated. The colloid or gum content which the filtered solution should have for best results, may vary considerably; for example, with a solution containing, say, 2% or 3% of colloid or gum, and upon following the procedure hereinafter set forth, a very satisfactory product has been obtained. On the other hand, the solution may be concentrated very considerably, say, to a 10% colloid or gum content, with the advantage of alcohol economy in the subsequent procedure, and usually with improved results in other respects, particularly as to dehydration of the precipitate hereinafter described.

The gum solution is then mixed with alcohol, a preferred procedure being to spray the former into a tank containing iso-propyl alcohol, while vigorously agitating the contents of the tank. The result of this treatment is a precipitation or coagulation of the gum or colloid, the precipitate being formed as the gum solution comes into the alcohol; the precipitate appears to be segregative as it forms, relative to the liquid, particularly where the mixing is achieved both by spraying the solution into the alcohol and by agitating the latter. That is, while the precipitate is forming or immediately after it forms, the precipitating or precipitated colloid is physically divided relative to the alcohol (although not necessarily into discrete particles), so that subsequent mechanical separation of the precipitate from the surrounding liquid vehicle is greatly facilitated. The vehicle, in which the so precipitated or coagulated colloid is carried, consists chiefly of alcohol and water, but also contains in solution the flavors, odors, soluble salts, organic acids, starches (if solubilized before the preliminary filtration), reducing sugars, coloring matter and like impurities present in the original gum solution.

Although in many cases other alcohols may be used (for instance, ethyl, methyl, n-propyl or like alcohols), I have found that the procedure just described is particularly effective with iso-propyl alcohol, of 91% strength. Generally, it is preferable that the alcohol be of low boiling point and be free or as free as is commercially practicable, from non-volatile ingredients or from ingredients other than water which have a higher boiling point than alcohol; this purity of the alcohol being especially desirable where the resulting colloid is to be used for food purposes. Although the proportions may be varied to a considerable extent without much variation in the results obtained, I have found that notably good results are had where the gum solution and alcohol are mixed (as in the manner just described) in such proportion that the resulting precipitate-containing vehicle includes about 50% of alcohol by weight. For example, where a 2% gum solution is used, the mixing tank should preferably contain about 50 parts by volume or more, of 91% isopropyl alcohol for each 36 parts by volume of gum solution introduced.

Another and very effective method of precipitating the colloid is to spray the extracted and filtered Irish moss solution into the vigorously agitated alcohol from a point below the surface of the latter, by means of fine nozzle or orifices similar to the spinnerettes used in the manufacture of artificial silk yarns. As before, the colloid is precipitated and attains a divided form not substantially later than the completion of the precipitating action; in fact, in this specific form of treatment, the precipitate tends to consist of discrete particles, usually in the form of segments of fine thread.

The coagulated mixture, as obtained in either of the described cases, may then be mechanically treated to remove the liquid which contains the soluble impurities. For example, the precipitate, which may be a more or less aggregated mass (although of porous or like divided structure) and from which a considerable quantity of the alcohol and water vehicle may have been drained, may be introduced into a basket centrifuge. The centrifuge is operated, and its action, which generally takes about 12 to 15 minutes, is to remove a great deal of the alcohol and water which are retained in and about the coagulated mass. Other or additional mechanical treatment can be performed, if desired, to reduce the alcohol and moisture content; to that end the coagulated mass, for example after centrifuging, may be introduced into a hydraulic press, and there subjected to a pressure of from 3,000 to 5,000 pounds per square inch for a suitable period of time, usually 15 to 45 minutes. It has generally been found inexpedient to attempt to hurry these stages of the process; e. g., when the colloid is precipitated in the specific manner hereinabove described, better results have usually been attained by extracting as much water or alcohol as possible from the precipitate, mechanically (preferably both by centrifuge and hydraulic press) and without application of heat.

In some cases, further purification of the precipitated colloid may be had by washing the mass with full strength alcohol (say, 91% isopropyl alcohol), after it has been centrifuged, and before any further treatment; such washing often effects a more complete removal of the organic or alcohol-soluble impurities particularly, including odors and flavors which might otherwise impair the utility of the product for food purposes.

After the alcohol and water have been mechanically separated from the coagulated mass (as in the manner described), it is generally found to contain only about 10 to 15% of alcohol and 5 to 8% of moisture, by weight. It may then, if desired, be passed through a hammer mill, which fluffs up the mass so as to speed up and facilitate subsequent drying. The fluffed product is thereafter distributed on screens and dried before a blast of warm air (for instance, air heated to 50°–60° C.); it is usually thoroughly dried in about 2 to 6 hours. In general, it appears that the less heat is applied, or the shorter its time of application, in drying, the higher will be the viscosity of the product; indeed in some cases, as after thorough centrifuging and application of direct pressure, the warm-air treatment may be dispensed with.

The refined and dried gum resulting from the foregoing procedure is extremely brittle, and may be pulverized very easily and without injuring its viscosity or other characteristics. The product thus obtained from the treatment of Irish moss, in accordance with the present invention, has been found to have a remarkable freedom from the marine type odor and flavor characteristic of the Irish moss heretofore available, and also from colors and other soluble impurities, including alcohol-soluble impurities; at the same time the product is characterized by a high solubility (specifically known as "rehydration factor") and an extremely high viscosity. Upon treating Irish moss in accordance with the procedure of the present invention, refined gums or colloids have been produced, of which one per cent solutions have a viscosity of several hundred centipoises, and in some cases as high as 1,000 centipoises or more, depending upon the character of the crude material treated. Like one per cent solutions of Irish moss gums refined according to the ordinary cooking, filtering and drying process have a viscosity of no more than 1.5 to 5 centipoises; indeed, according to actual tests, no supposedly refined Irish moss gum made by the ordinary process or by any other prior process mentioned herein, has a viscosity (in a one per cent solution) higher than about 5 centipoises. Of course, in some cases, as when the procedure of the present invention is curtailed or hastened, the product may have a lower viscosity than the high values mentioned hereinabove; but it will be understood that an Irish moss gum of which a one per cent solution has a viscosity of 200 centipoises, or even 50 centipoises, represents a distinct and valuable improvement over any previous Irish moss gum (i. e., any such gum extracted from its crude fiber and dried) of which I am aware.

The viscosities mentioned above are stated in accordance with the scale or measurement of a standard MacMichael viscosimeter, standardized against C. P. 95% glycerine, distilled water, and commercial #1 castor oil. One per cent gum solutions have been taken for example, that being one of the strengths useful in food industries utilizing these gums; but it will be understood that when measured in other strengths of solution, the gum of the present invention affords a similarly improved viscosity over the previous gums (measured in solutions of corresponding strength). It will also be understood that wherever mention is made herein, or in the appended claims, of the "viscosity" or "viscosity factor" of a gum or colloid, there is meant the viscosity of an aqueous solution (i. e., rehydration) of such gum or colloid.

It may be noted that whereas attempts have been hitherto made to remove certain impurities from commercial Irish moss powder or unground or coarsely milled Irish moss by subjecting the material to the action of a mixture of water and an alcohol miscible therein (i. e., the crude dry material is added to the mixture of water and alcohol), such treatment requires subsequent drying and pulverization of the ordinary sort such as to prevent the attainment of a high viscosity product. The same is true of another prior process in which the dry material is centrifuged with water (without attempt to remove crude fiber or alcohol-soluble impurities).

The process of the present invention, however, affords, particularly in the precipitation step, an intimate action otherwise unattainable, and a far more complete removal of soluble impurities than in prior methods, so that a more highly purified product is achieved. Furthermore, odors and flavors are effectively removed by the process; and particularly by reason of the alcohol-precipitating treatment as described, and by reason of the mechanical liquid separation thereby facilitated, the material is quickly and effectively dried, without long or high-temperature heating so as to impair the viscosity. The ultimate product, when dry, has extremely high solubility and viscosity and is of such stability that it can be stored for years without appreciably losing any of its valuable properties; and it may be ground to any industrially required fineness without impairment of those properties.

It has been found that the procedure of the invention—for example, as specifically described hereinabove—may be employed to distinct advantage in the treatment of equivalent materials, with the corresponding production of the refined product having an improved purity, solubility, and viscosity factor.

Other examples of procedure whereby a highly purified and refined colloid may be made are the following:

1. A solution of Irish moss gum extracted and filtered in the ordinary way is fed to the interior of a mixing nozzle, where it is rapidly mixed with 91% iso-propyl alcohol in the proportion of about 50 parts by volume of the latter to each 36 parts by volume of gum solution. The mixture is immediately carried to a grinding apparatus of the type generally called an attrition mill, which further mixes the liquids, and grinds up or shreds or pulverizes the colloid coagulated or precipitated by the alcohol, thus not only effecting division of the precipitate with respect to the liquid but actually comminuting it as fast as it is formed and, it is believed, while the precipitating action is actually going on. The precipitated particles are then filtered from their alcohol and water vehicle in a filter press, and may thereafter be treated in a basket centrifuge to remove further liquid, and subsequently dried with mild heat, to produce a refined, dry colloid in comminuted form.

2. A solution of Irish moss gum extracted and filtered in the ordinary way and placed in a suitable receptacle is violently agitated and at the same time 91% iso-propyl alcohol is mixed in quickly until the resultant mixture has an actual or true alcohol content of 50%. This precipitate-forming mixture, which has a "milky" appearance, is thereafter forced through an orifice of less than three-sixteenths inch in diameter (as in a mixing nozzle), where it is intimately mixed with 91% iso-propyl alcohol. The result is to produce not only a precipitated colloid which is divided with respect to the liquid but one which is very effectively comminuted by the strong shearing force of the alcohol as the latter completes the precipitating action at the small orifice. The precipitated particles are then separated from their alcohol and water vehicle in a filter press and subsequently dried with mild heat, producing a refined, dry colloid in comminuted form.

The product of each of the procedures just set forth is a refined, comminuted gum having all of the improved and very advantageous characteristics which are attained by following the previously described examples of the process of the invention, and which include the desirable characteristics of high purity, solubility and viscosity, hereinabove stated to be so attained; and the same is correspondingly true of the product of these procedures when either of them is applied to the treatment of equivalent materials.

It will be understood that the invention is not limited to the specific procedures, features and uses herein described or shown, and set forth by way of illustration, but the described steps and procedures, although designed to be used in the combinations and relations stated, may be modified, curtailed, or used in other combinations or relations, and the invention carried out in other ways or to other ends, without departure from its spirit as defined by the following claims.

I claim:

1. In procedure for removing soluble impurities from Irish moss gum and for obtaining therefrom a purified colloid of high viscosity, the steps of establishing an aqueous solution of Irish moss gum, and precipitating the gum from said solution as a segregative precipitate free of soluble impurities and readily susceptible of mechanical separation from the impurity-containing liquid for rapid drying of said precipitate with no more than mild heat, by passing successive small increments of said gum solution into a large body of alcohol while effecting thorough physical division of the dissolved and precipitating gum relative to the alcohol.

2. In procedure for removing soluble impurities from Irish moss gum and for obtaining therefrom a purified colloid of high viscosity, the steps of establishing an aqueous solution of Irish moss gum, precipitating the gum from said solution as a segregative precipitate free of soluble impurities and readily susceptible of mechanical separation from the impurity-containing liquid for rapid drying of said precipitate without impairment of its viscosity, by spraying the said gum solution into a large body of alcohol while agitating the latter, and separating the liquid from the resulting precipitate to produce a dried, purified, flavorless and odorless Irish moss gum of high viscosity, said liquid separation including subjecting the precipitate to mechanical separating action for removal of a substantial quantity of the liquid therefrom.

3. A process of refining Irish moss gum, comprising establishing an aqueous solution of Irish moss gum, precipitating the gum from said solution as a purified segregative precipitate readily susceptible of mechanical separation of liquid therefrom, by passing successive small increments of said Irish moss gum solution into a large body of alcohol while effecting thorough physical division of the dissolved and precipitating gum relative to the alcohol, subjecting the resulting precipitate to mechanical separating action for removal of a substantial quantity of the liquid therefrom, and thereafter completing drying of the precipitate at a temperature substantially less than 100° C.

4. As a new product, dry, refined Irish moss gum of which a one per cent solution has a viscosity of not less than about 50 centipoises, and which is free of water-insoluble material and has the properties, including high purity, ready solubility and high viscosity, characteristic of Irish moss gum refined and purified by the process which comprises establishing an aqueous solution of Irish moss gum, precipitating the gum from said solution as a purified segregative precipitate readily susceptible of mechanical separation of liquid therefrom, by spraying the said gum solution into a large body of strong isopropyl alcohol while agitating the latter, and separating the liquid from the resulting precipitate to produce a dried purified colloid of high viscosity, said liquid separation including mechanically reducing the liquid associated with said precipitate to no more than a small percentage of the weight of the gum, and thereafter completing drying of the precipitate with mild heat.

5. In procedure for removing soluble impurities from Irish moss gum and for obtaining therefrom a purified colloid of high viscosity, the steps of establishing an aqueous solution of Irish moss gum, and precipitating the gum from said solution as a purified segregative precipitate readily susceptible of mechanical separation of liquid therefrom, by passing successive small increments of said Irish moss gum solution into a large body of alcohol while effecting thorough physical division of the dissolved and precipitating gum relative to the alcohol, the total gum solution thus introduced being in the proportion of not more than about 36 parts by volume for each 50 parts by volume of alcohol.

6. In procedure for removing soluble impurities from Irish moss gum and for obtaining therefrom a purified colloid of high viscosity, the steps of establishing an aqueous solution of Irish moss gum, and precipitating the gum from said solution as a purified segregative precipitate readily susceptible of mechanical separation of liquid therefrom, by spraying the said gum solution into a large body of alcohol while agitating the latter, the total gum solution thus introduced being in the proportion of not more than about 36 parts by volume for each 50 parts by volume of alcohol.

7. As a new product, dry, purified Irish moss gum which is free of water-insoluble material and of which a one per cent aqueous solution has a viscosity of at least about 200 centipoises, and which has high purity, ready solubility and high viscosity, and is substantially identical with Irish moss gum refined and purified by the process which comprises establishing an aqueous solution of Irish moss gum, precipitating the gum from said solution as a purified segregative precipitate readily susceptible of mechanical separation of liquid therefrom, by spraying the said gum solution into a large body of strong isopropyl alcohol while agitating the latter, the total gum solution thus introduced being in the proportion of not more than about 36 parts by volume for each 50 parts by volume of alcohol, and separating the liquid from the resulting precipitate to produce a dried purified colloid of high viscosity, said liquid separation including mechanically reducing the liquid associated with said precipitate to no more than a small percentage of the weight of the gum, and thereafter completing drying of the precipitate with mild heat.

8. As a new product, Irish moss gum of which a one per cent aqueous solution has a viscosity of at least about 200 centipoises, and which is in dry form and which has ready solubility and substantial freedom from odor- and flavor-imparting substances and is substantially identical with the refined Irish moss gum prepared by the process comprising establishing an aqueous solution of Irish moss gum, precipitating the gum from said solution as a purified segregative precipitate by passing successive small increments of said gum solution into a large body of alcohol while effecting thorough physical division of the dissolved and precipitating gum relative to the alcohol, subjecting the precipitate to mechanical separating action for removal of a substantial quantity of the liquid therefrom, and drying the precipitate at a temperature of about 50° to 60° C.

9. As a new product, Irish moss gum of which a one per cent aqueous solution has a viscosity of not less than about 50 centipoises, and which is in dry form and free of water-insoluble material, and which has ready solubility and substantial freedom from odor- and flavor-imparting substances and is substantially identical with the gum precipitated by spraying not more than about 36 parts by volume of a 2% solution of Irish moss gum into a body of alcohol comprising about 50 parts of 91% isopropyl alcohol, followed by separation of the precipitate from the liquid and by subsequent drying of the precipitate at a temperature of about 50° to 60° C.

ARNOLD PFISTER.